(12) United States Patent
Tamaoka

(10) Patent No.: US 7,764,000 B2
(45) Date of Patent: Jul. 27, 2010

(54) SPINDLE MOTOR

(75) Inventor: Takehito Tamaoka, Tokyo (JP)

(73) Assignee: Nidec Corporation, Kyoto (JP)

( * ) Notice: Subject to any disclaimer, the term of this patent is extended or adjusted under 35 U.S.C. 154(b) by 319 days.

(21) Appl. No.: 11/954,850

(22) Filed: Dec. 12, 2007

(65) Prior Publication Data

US 2008/0158729 A1 Jul. 3, 2008

(30) Foreign Application Priority Data

Dec. 27, 2006 (JP) .............................. 2006-351530

(51) Int. Cl.
  *H02K 5/16* (2006.01)
  *G11B 17/02* (2006.01)
(52) U.S. Cl. .................. 310/90; 310/67 R; 310/89; 310/91; 360/99.03; 360/99.07; 360/99.08; 384/105; 384/107; 384/121; 384/160; 384/164
(58) Field of Classification Search .............. 310/67 R, 310/89, 90, 91; 360/98.07, 99.03, 99.08; 384/105, 107, 121, 160, 164; *G11B 17/02; H02K 5/16*
  See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,836,040 B2 | 12/2004 | Watanabe et al. | |
| 7,021,829 B2 | 4/2006 | Tamaoka | |
| 7,133,250 B2 * | 11/2006 | Herndon et al. | 360/99.08 |
| 2003/0031114 A1 * | 2/2003 | Noda et al. | 369/269 |
| 2003/0132676 A1 * | 7/2003 | Hirose et al. | 310/90 |
| 2004/0000825 A1 * | 1/2004 | Hirose et al. | 310/90 |
| 2004/0091187 A1 * | 5/2004 | Aiello et al. | 384/112 |
| 2004/0212921 A1 * | 10/2004 | Herndon et al. | 360/99.08 |
| 2005/0116564 A1 * | 6/2005 | Tokunaga et al. | 310/90 |
| 2006/0051001 A1 | 3/2006 | Nishimura et al. | |
| 2006/0138887 A1 * | 6/2006 | Yamamoto et al. | 310/90 |
| 2006/0152097 A1 * | 7/2006 | Obata et al. | 310/90 |
| 2006/0165323 A1 * | 7/2006 | Son et al. | 384/100 |
| 2006/0207098 A1 | 9/2006 | Tamaoka | |
| 2006/0255672 A1 * | 11/2006 | Flores et al. | 310/90 |

(Continued)

FOREIGN PATENT DOCUMENTS

JP 2002-256280 A 9/2002

(Continued)

*Primary Examiner*—Quyen Leung
*Assistant Examiner*—John K Kim
(74) *Attorney, Agent, or Firm*—Keating & Bennett, LLP

(57) ABSTRACT

A shaft, a circular plate portion and a cylindrical portion are integrally formed with one another through cutting operations to provide a rotor hub of a motor. An inner region on the lower surface of the circular plate portion is formed continuously with the outer peripheral surface of the shaft, and a hub thrust portion is provided in the inner portion so as to axially face a sleeve thrust portion on a sleeve main body. A stepped portion on the lower surface of the circular plate portion is disposed on the outer side of thrust dynamic pressure grooves on the sleeve thrust portion. In this manner, the stepped portion is disposed in a region where a thrust bearing portion is not provided, so that the hub thrust portion can be formed at a low cost in manufacturing the rotor hub by cutting.

13 Claims, 17 Drawing Sheets

U.S. PATENT DOCUMENTS

2008/0019038 A1 * 1/2008 Xu et al. .................. 360/99.08

FOREIGN PATENT DOCUMENTS

| | | |
|---|---|---|
| JP | 2002-354747 A | 12/2002 |
| JP | 2003-23751 A | 1/2003 |
| JP | 2004-181396 A | 7/2004 |
| JP | 2006-266367 A | 10/2006 |
| JP | 2008-069805 A | 3/2008 |
| JP | 2008-069835 A | 3/2008 |

* cited by examiner

SPINDLE MOTOR

BACKGROUND OF THE INVENTION

1. Field of the Invention

The present invention relates to a motor with a bearing mechanism utilizing a hydrodynamic pressure, a disk drive including the motor, and a method of manufacturing a rotor hub of the motor.

2. Description of the Related Art

Conventionally, a disk drive referred to as a hard disk drive includes a spindle motor (hereinafter referred to as a "motor") for driving and rotating a disk-shaped storage medium (hereinafter, referred to as a "disk"). The disk is mounted on a rotor hub of the motor. The rotor hub is rotatably supported relative to a base portion via a bearing mechanism centered on a predetermined rotation axis. As an exemplary bearing mechanism of this type, a fluid dynamic pressure bearing utilizing a dynamic pressure of lubricant oil between a shaft and a sleeve is currently in use.

A fluid dynamic pressure bearing in a recording medium drive described in Japanese Unexamined Patent Application Publication No. 2006-266367, for example, is constituted by a rotor and a cylindrical sleeve for receiving a shaft of the rotor. Grooves for producing thrust dynamic pressure are provided on the upper end surface of the sleeve. While the rotor is rotating, a dynamic pressure is generated by lubricant oil being drawn radially inward within the space between the lower surface of a circular plate portion of the rotor and the upper end surface of the sleeve, thereby supporting the rotor.

In the rotor of the above recording medium drive, a tubular portion is formed integrally with the circular plate portion of the rotor and the shaft such that the tubular portion extends downward from the outer periphery of the circular plate portion. At the clearance between the inner peripheral surface of the tubular portion and the outer peripheral surface of the sleeve, a capillary seal is formed for retaining the oil by the action of surface tension.

In a recording disk driving motor described in Japanese Unexamined Patent Application Publication No. 2003-23751, a thrust bearing portion is constructed such that a lubricant fluid is retained in the minute space between the upper end surface of a sleeve and the lower surface of a substantially disked-shaped upper wall portion of a rotor hub. The minute space of the thrust bearing portion becomes wider as it moves radially outward.

Known as a method of manufacturing the rotor hub of such motors is a method in which cutting is performed on a steel material such as stainless steel to form parts of the rotor hub.

For manufacturing through cutting operations a rotor in which a shaft, a circular plate portion around the shaft, and a tubular portion are formed integrally with one another, such as the one described in Japanese Unexamined Patent Application Publication No. 2006-266367, it is necessary that the lower surface of the circular plate portion be formed smooth to a high degree of accuracy, because a hub thrust portion is to be provided thereon for configuring a thrust bearing portion with the upper end surface of the sleeve, as described above.

SUMMARY OF THE INVENTION

A motor according to a preferred embodiment of the present invention includes a rotor portion and a stationary portion which can support the rotor portion in a rotatable manner. The rotor portion includes a shaft, a rotor hub, and a rotor magnet fixed on the rotor hub. The rotor hub has a circular plate portion in a substantially circular disk shape, and a cylindrical portion in a substantially cylindrical shape. The circular plate portion extends radially outward from an upper portion of the shaft. The cylindrical portion is centered on the shaft and protrudes from the circular plate portion in the same direction as that of the shaft.

The stationary portion includes a sleeve portion and a stator. The shaft is inserted in the sleeve portion. Torque centered on the central axis of the shaft is generated around the sleeve portion through the interaction between the stator and the rotor magnet.

The lower surface of the circular plate portion is provided with a substantially annular outer portion, a substantially annular inner portion located radially inside the outer portion, and a stepped portion between the inner portion and the outer portion. A working fluid is arranged in the gap between a hub thrust portion which is one of the inner portion and the outer portion and a sleeve thrust portion defined on the sleeve portion and axially opposing the hub thrust portion. Thrust dynamic pressure grooves are provided on at least one of the hub thrust portion and the sleeve thrust portion.

According to a preferred embodiment of the present invention, the hub thrust portion on the rotor hub can be formed by cutting at a low cost. Also, the contact of the stepped portion with the sleeve portion can be certainly avoided. In addition, the bearing stiffness of the thrust bearing portion can be enhanced. Further, air can be efficiently released from the working fluid while the motor is being driven.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
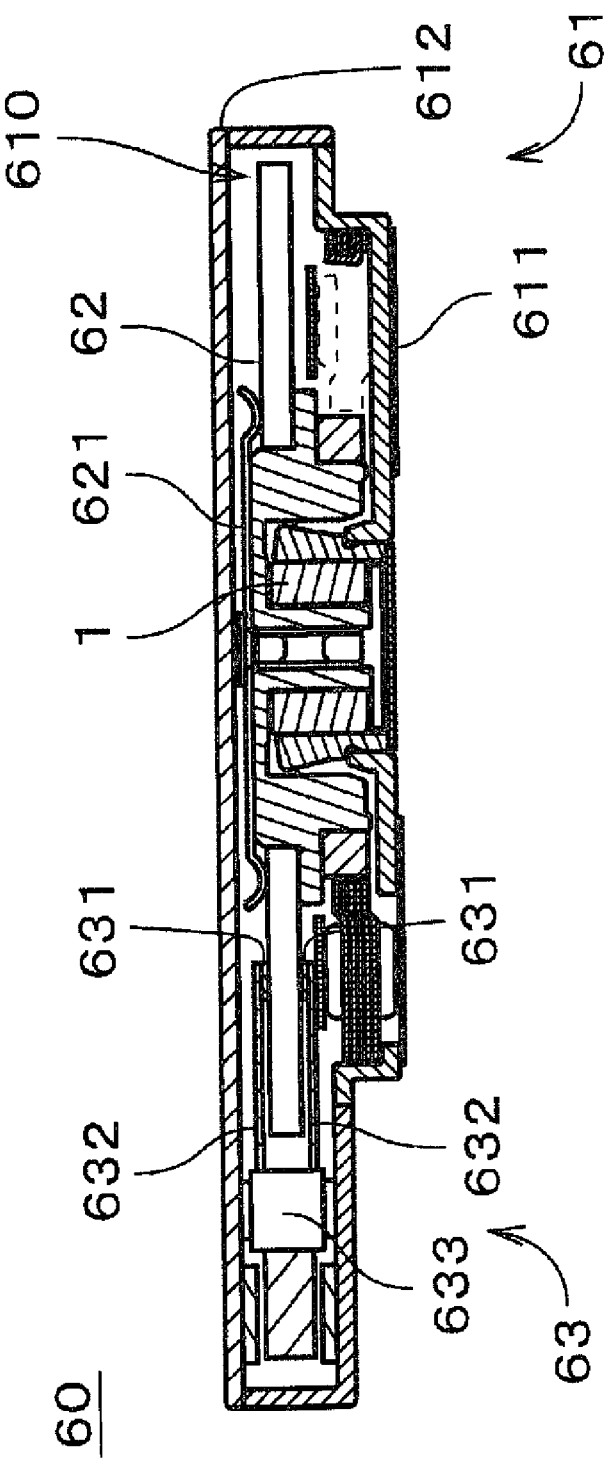
FIG. 1 shows an internal structure of a disk drive according to a first preferred embodiment of the present invention.

Referring to FIGS. 1 through 13, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

First Preferred Embodiment

FIG. 1 is a longitudinal cross-sectional view showing an internal structure of a disk drive 60 including an electric spindle motor 1 (hereinafter referred to as a "motor 1") according to a first preferred embodiment of the present invention.

The disk drive 60 is a so-called hard disk drive, and includes a disk-shaped storage medium (hereinafter, referred to as a "disk") 62 which can store data, an access unit 63, the electric motor 1, and a housing 61. The access unit 63 carries out at least one of writing data on and reading data from the disk 62. The motor 1 rotates while holding the access unit 63 and the disk 62. In this preferred embodiment, the housing 61 houses the disk 62, the access unit 63, and the motor 1 in its internal space 610, and a 1.8-inch disk is used as the disk 62.

As shown in FIG. 1, the housing 61 includes a first housing member 611 and a plate-like second housing member 612. The first housing member 611 has an opening at its top, and is mounted with the motor 1 and the access unit 63 on its inner bottom. The second housing member 612 covers the opening of the first housing member 611 to create the internal space 610. In the disk drive 60, the housing 61 is constructed by joining the first and second housing members 611 and 612, and its internal space 610 is an almost dustless clean space.

The disk 62 is placed on the upper side of the motor 1 and fixed thereto by a clamp 621. The access unit 63 has a magnetic head 631, an arm 632 supporting the head 631, and a head moving mechanism 633. The magnetic head 631 operates very close over the disk 62 for reading and writing data. The head moving mechanism 633 moves the arm 632 to relatively move the head 631 with respect to the disk 62 and the motor 1. In this manner, the head 631 moves in immediate proximity to the spinning disk 62 to access a required position on the disk 62, whereby data is written and read.

Figure 2:
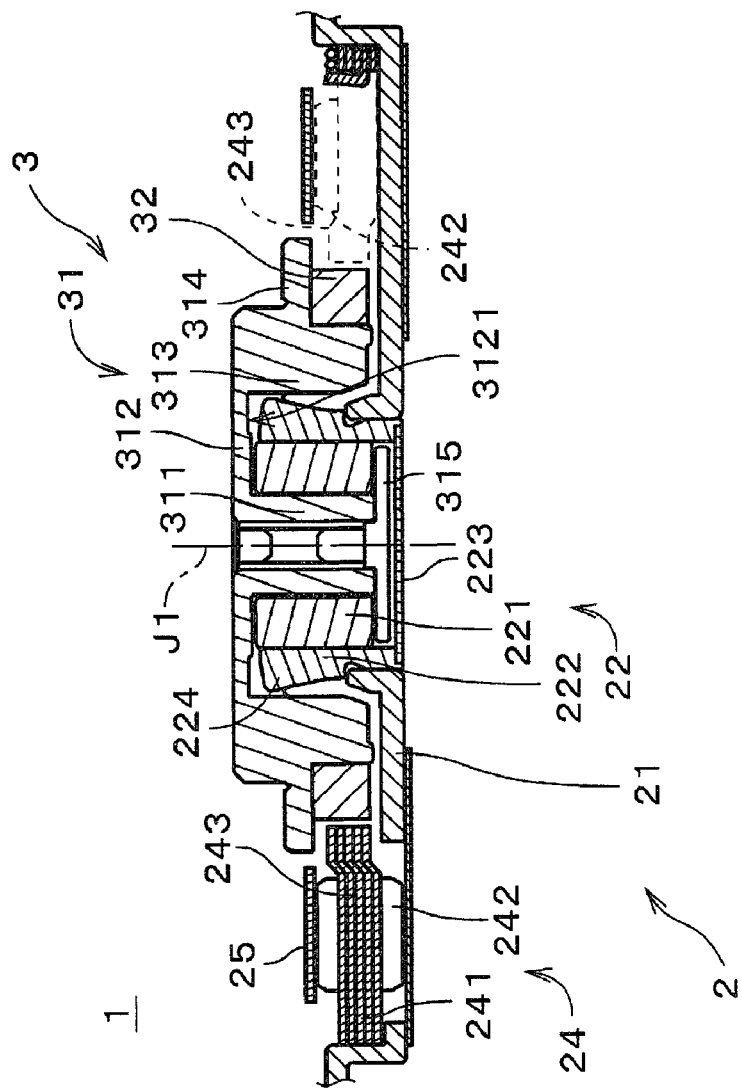
FIG. 2 is a longitudinal cross-sectional view of a motor.

FIG. 2 is a longitudinal cross-sectional view of the motor 1 used for spinning the disk 62 in the disk drive 60. While FIG. 2 shows a cross section taken along a plane including a central axis J1 of the motor 1, structures situated at a receded position from the cutting plane are also partially illustrated with broken lines. The central axis J1 is also the central axis of a shaft 311 of a rotor hub 31, which will be described later.

As shown in FIG. 2, the motor 1 is an inner-rotor type motor, and includes a stationary portion 2 as a fixed assembly and a rotor portion 3. The rotor portion 3 is supported to be rotatable about the central axis J1 of the motor 1 relative to the stationary portion 2 via a bearing mechanism utilizing a hydrodynamic pressure of lubricant oil as a working fluid.

The stationary portion 2 includes a base plate 21, a hollow, substantially cylindrical sleeve unit 22 centered on the central axis J1, a stator 24, and a thin magnetic shield plate 25. The base plate 21 constitutes a portion of the first housing member 611 (see FIG. 1), and holds constituent parts of the stationary portion 2. The sleeve unit 22 constitutes a portion of the bearing mechanism for rotatably supporting the rotor portion 3. The stator 24 is attached to the base plate 21 around the sleeve unit 22. The magnetic shield plate 25 is disposed on the upper side of the stator 24 to shield electromagnetic noises from the stator 24.

The sleeve unit 22 includes a sleeve main body 221, a hollow, substantially cylindrical sleeve housing 222, and a seal cap 223. The sleeve main body 221 has a hollow, substantially cylindrical shape centered on the central axis J1, and faces the outer peripheral surface of the shaft 311 of the rotor portion 3 with the lubricant oil therebetween. The sleeve housing 222 is located at the outer periphery of the sleeve main body 221. The seal cap 223 blocks the lower end of the sleeve housing 222.

The sleeve main body 221 is a porous member impregnated with the lubricant oil, and held by the sleeve housing 222. The lower portion of the sleeve unit 22 is press-fitted into an opening provided at the center of the base plate 21 to be fixed there. In the sleeve unit 22, the upper end surface of the sleeve main body 221 is positioned axially above the upper end surface of the sleeve housing 222.

The stator 24 has a stator core 241 with a plurality of teeth 243, and a plurality of coil windings 242 formed by winding conductive wires around the plurality of teeth 243.

The rotor portion 3 includes the rotor hub 31 and a rotor magnet 32. The disk 62 (see FIG. 1) is secured on the rotor hub 31. The rotor magnet 32 is fixed on the rotor hub 31 so as to be disposed about the central axis J1.

The rotor hub 31 has the shaft 311, a circular plate portion 312, and a cylindrical portion 313. The shaft 311 is hollow, substantially cylindrical, centered on the central axis J1, and projects downward. The circular plate portion 312 is in the form of substantially circular, centered on the central axis J1, and extends radially outward from the upper end of the shaft 311. The cylindrical portion 313 has a hollow, substantially cylindrical shape centered on the central axis J1 and projects downward from the outer peripheral edge of the circular plate portion 312.

The rotor hub 31 has a disk placing portion 314 that projects radially outward from the outer peripheral surface of the cylindrical portion 313 to surround the circular plate portion 312. The disk 62 is mounted on the disk placing portion 314. In this preferred embodiment, the shaft 311, the circular plate portion 312, the cylindrical portion 313, and the disk placing portion 314 of the rotor hub 31 are all formed from a unity piece such as stainless steel. The shaft 311 is attached with a substantially circular disk-like thrust plate 315 at the lower end.

The rotor magnet 32 is a substantially annular magnet, for example, which is magnetized to have multiple poles, and is fixed on the outer peripheral surface of the cylindrical portion 313 of the rotor hub 31. The rotor magnet 32 is disposed on the central axis J1 side of the stator 24 so as to generate, with the stator 24, torque centered on the central axis J1. In the stator 24, each of the teeth 243 is bent upward its the inner peripheral portion. The inner peripheral portion of each tooth 243 radially faces the outer peripheral surface of the rotor magnet 32, so that torque is generated efficiently between the stator 24 and the rotor magnet 32.

Figure 3:
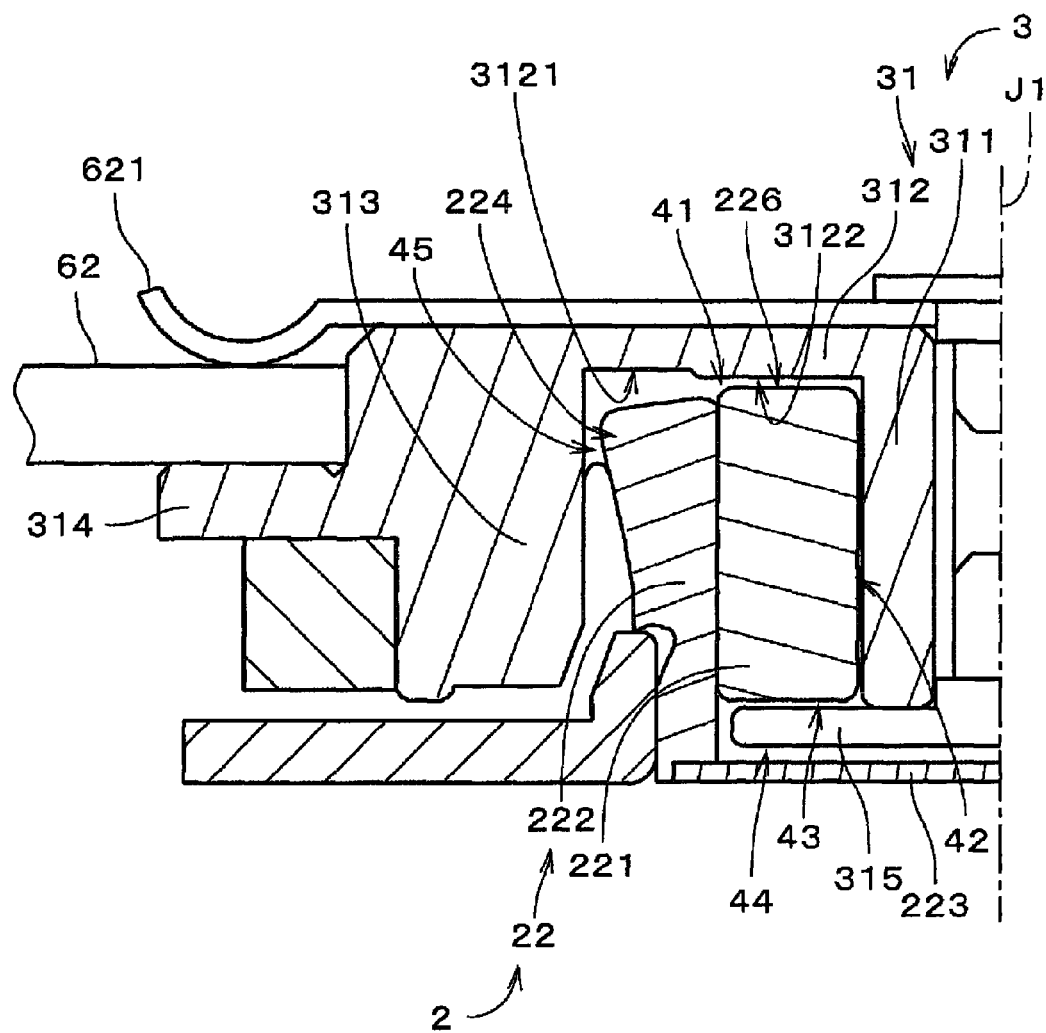
FIG. 3 is a longitudinal cross-sectional view showing part of the motor.

FIG. 3 is a longitudinal cross-sectional view showing part of the motor 1 in an enlarged manner. FIG. 3 also illustrates the disk 62 and the clamp 621 which is a fixing member for fixing the disk 62 on the rotor hub 31.

As shown in FIG. 3, the upper ends of the circular plate portion 312 and the cylindrical portion 313 are located above the top surface of the disk placing portion 314, inside the disk placing portion 314. The disk 62 is fitted around the outer peripheral surface in the upper portion of the cylindrical portion 313. At this point, the bottom surface of the disk 62 is in contact with the disk placing portion 314.

In a portion on the upper end of the cylindrical portion 313, a screw hole is provided to extend downward therefrom. The clamp 621 is fastened on to the rotor hub 31 while being in contact with the top surface of the disk 62 by a screw (not shown) screwed down into the screw hole. In this way, the disk 62 is held between the clamp 621 and the disk placing portion 314.

Next, the bearing mechanism of the motor 1 is now described. As shown in FIG. 3, an upper gap 41, a side gap 42, a first lower gap 43, a second lower gap 44, and an outer gap 45 are formed in the motor 1. The upper gap 41 is formed between the lower surface 3121 of the circular plate portion 312 of the rotor hub 31 and the upper end surface of the sleeve unit 22. The side gap 42 is formed between the inner peripheral surface of the sleeve main body 221 and the outer peripheral surface of the shaft 311. The first lower gap 43 is formed between the lower end surface of the sleeve main body 221 and the top surface of the thrust plate 315. The second lower gap 44 is formed between the bottom surface of the thrust plate 315 and the top surface of the seal cap 223. The outer gap 45 is formed between the outer peripheral surface of a flange portion 224 provided at an upper portion of the sleeve housing 222 and the inner peripheral surface of the cylindrical portion 313 of the rotor hub 31.

In the motor 1, the bearing mechanism for supporting the rotor portion 3 relative to the stationary portion 2 in a rotatable manner about the central axis J1 is so configured that these gaps are continuously filled with the lubricant oil in an uninterrupted manner.

The outer peripheral surface of the flange portion 224 of the sleeve housing 222 is slants with respect to the central axis J1 with its diameter reduced gradually in the downward direction. The outer gap 45 between the flange portion 224 and the cylindrical portion 313 gradually becomes larger as it moves downward away from the circular plate portion 312. With this structure, the interface between the lubricant oil and air in the outer gap 45 forms a meniscus due to capillary action and surface tension. The outer gap 45 serves as a tapered seal as well as an oil buffer, so that the lubricant oil is prevented from flowing out.

Figure 4:
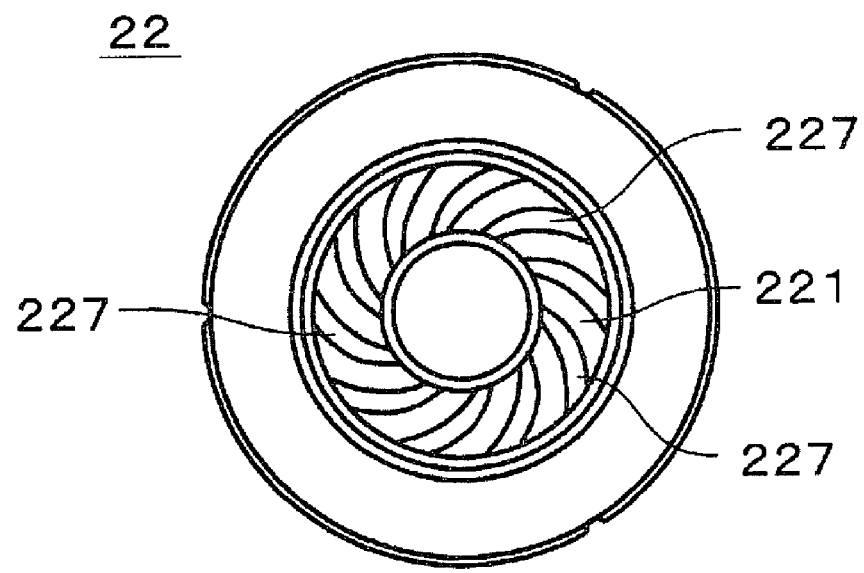
FIG. 4 is a plan view of a sleeve unit.

FIG. 4 is a plan view of the sleeve unit 22. As shown in FIG. 4, a plurality of thrust dynamic pressure grooves 227 are provided in a spiral arrangement on the upper end surface of the sleeve main body 221 of the sleeve unit 22.

Referring to FIG. 3, a thrust bearing portion includes a sleeve thrust portion 226 and a hub thrust portion 3122. The sleeve thrust portion 226 is a region provided with the thrust dynamic pressure grooves 227 on the upper end surface of the sleeve unit 22. The hub thrust portion 3122 is a portion on the lower surface 3121 of the circular plate portion 312 of the rotor hub 31 and axially faces the sleeve thrust portion 226.

In the motor 1, the sleeve thrust portion 226 lies in a plane perpendicular to or substantially perpendicular to the central axis J1 of the shaft 311. In the state where the disk 62 is mounted on the rotor hub 31, the hub thrust portion 3122 also comes to lie in a plane perpendicular to or substantially perpendicular to the central axis J1 of the shaft 311, namely, the sleeve thrust portion 226 and the hub thrust portion 3122 which oppose each other are positioned in parallel to or substantially parallel to each other.

During rotation of the rotor portion 3, the thrust dynamic pressure grooves 227 on the sleeve thrust portion 226 generate a pressure that causes the lubricant oil present in the gap between the sleeve thrust portion 226 and the hub thrust portion 3122 to go inward in the radial direction.

In the sleeve unit 22, thrust dynamic pressure grooves (e.g., spiral grooves) are also provided on the lower end surface of the sleeve main body 221 for generating a pressure that acts on the lubricant oil to make it move inward in the radial direction during rotation of the rotor portion 3. The lower end surface of the sleeve main body 221 and the top surface of the thrust plate 315 that axially opposes to each other and the lubricant oil form a thrust bearing portion.

On at least one of the outer peripheral surface of the shaft 311 and the inner peripheral surface of the sleeve main body 221 which in combination define the side gap 42, there are formed a plurality of radial dynamic pressure grooves (e.g., herringbone grooves) for generating a hydrodynamic pressure in the lubricant oil, so that a radial bearing portion is configured at the side gap 42.

In the motor 1, the rotor portion 3 is supported in a non-contact manner by the bearing mechanism utilizing a hydrodynamic pressure of the lubricant oil via the lubricant oil. Hence, the rotor portion 3 and the disk 62 fixed thereon can be rotated highly accurately and with low noises.

Figure 5:
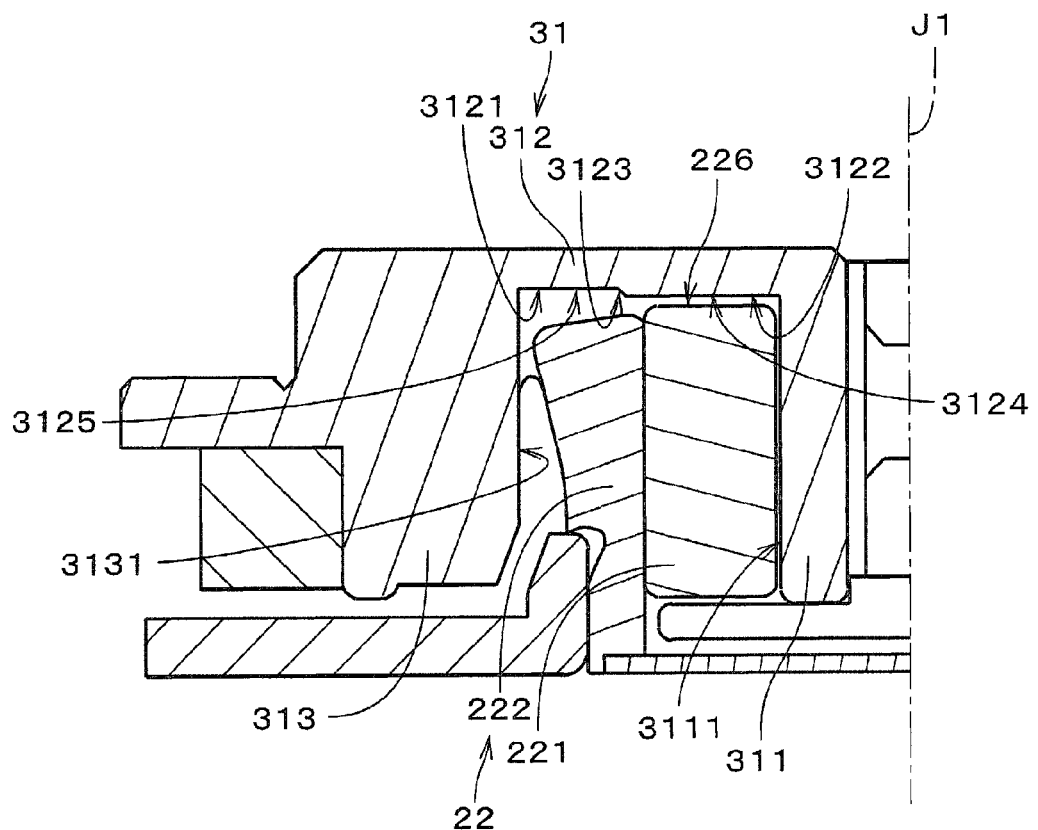
FIG. 5 is a longitudinal cross-sectional view showing part of a rotor hub.
Figure 6:
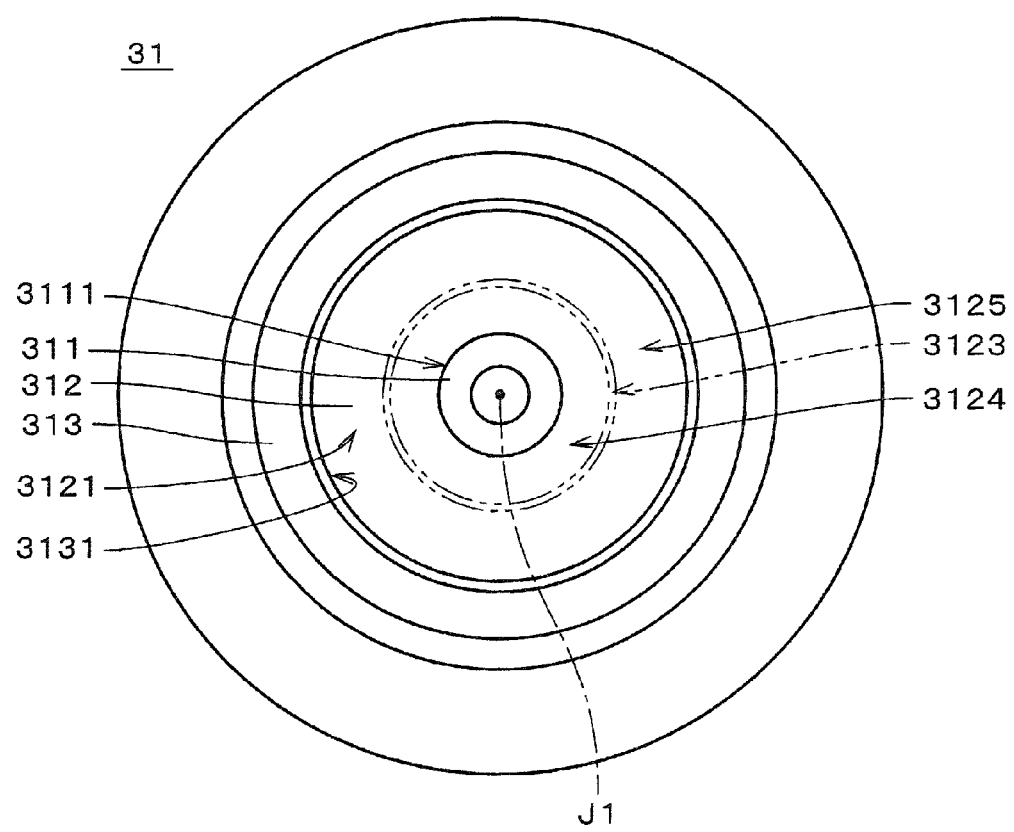
FIG. 6 is a bottom view of the rotor hub.

FIG. 5 is a longitudinal cross-sectional view showing part of the rotor hub 31, and FIG. 6 is a bottom view of the rotor hub 31. FIG. 5 also illustrates part of the sleeve unit 22. On the lower surface 3121 of the circular plate portion 312 of the rotor hub 31, a substantially annular stepped portion 3123 centered on the central axis J1 is provided between the shaft 311 and the cylindrical portion 313, as shown in FIG. 5. In FIG. 6, the stepped portion 3123 is defined by two-dot chain lines.

As shown in FIGS. 5 and 6, an inner portion 3124 and an outer portion 3125 are provided on the lower surface 3121 of the circular plate portion 312. The inner portion 3124 is provided radially inside the stepped portion 3123, and the outer portion 3125 is provided radially outside the stepped portion 3123. The inner portion 3124 is situated below the outer portion 3125. The axial distance between the inner portion 3124 and the outer portion 3125 is preferably 10 μm or less.

In the motor 1, the inner portion 3124 is to be the hub thrust portion 3122 that opposes the thrust dynamic pressure grooves 227 (see FIG. 4) on the sleeve main body 221. The stepped portion 3123 is located between the inner portion 3124 and the outer portion 3125, and is continuous with both the inner portion 3124 and the outer portion 3125. The stepped portion 3123 axially faces the upper end surface of the sleeve housing 222. The stepped portion 3123 is located on the radially outer side of the sleeve thrust portion 226 and the thrust dynamic pressure grooves 227 provided on the sleeve thrust portion 226.

Figure 7:
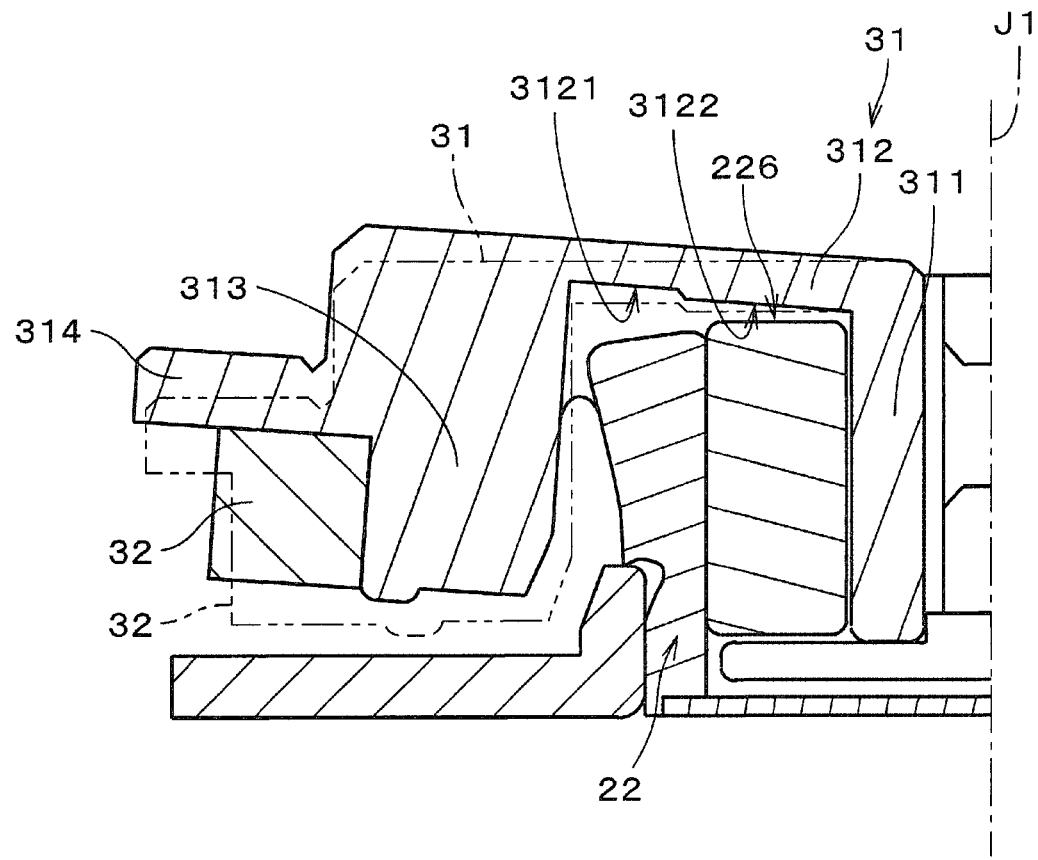
FIG. 7 is a longitudinal cross-sectional view showing part of the motor.

FIG. 7 is a longitudinal cross-sectional view showing part of the motor 1 in the state where the disk 62 is not mounted yet. As shown in FIG. 7, the circular plate portion 312 of the rotor hub 31 slants upward as the distance from the central axis J1 increases, in the state where the disk 62 (see FIG. 5) is not mounted on the rotor hub 31.

On the lower surface 3121 of the circular plate portion 312, a slant surface is provided in the hub thrust portion 3122 such that the slant surface gradually separates from the sleeve thrust portion 226 as the distance from the shaft 311 increases. That is, the slant surface is slanted with respect to the central axis J1. In this preferred embodiment, the angle of inclination of the lower surface 3121 of the circular plate portion 312 is about 0.06 to about 0.12 degrees with respect to a plane perpendicular to the central axis J1. In FIG. 7, the inclination of the circular plate portion 312 is illustrated in an exaggerated manner in comparison to the actual inclination.

In the motor 1, the disk 62 is fixed on the rotor hub 31 with the clamp 621, whereby the disk placing portion 314 of the rotor hub 31 is pressed by the clamp 621 with the disk 62 therebetween, so that the circular plate portion 312 of the rotor hub 31 shown in FIG. 7 is bent toward the sleeve unit 22, as shown in FIG. 3. In this manner, the circular plate portion 312, the cylindrical portion 313, the disk placing portion 314, and the rotor magnet 32 of the rotor hub 31 are all positioned at the position shown with two-dot chain line in FIG. 7. In the motor 1, as shown in FIG. 3, the hub thrust portion 3122 on the lower surface 3121 of the rotor hub 31 thus becomes perpendicular to or substantially perpendicular to the central axis J1 in the state where the circular plate portion 312 is bent due to the fixing of the disk 62 as described above.

Figure 8:
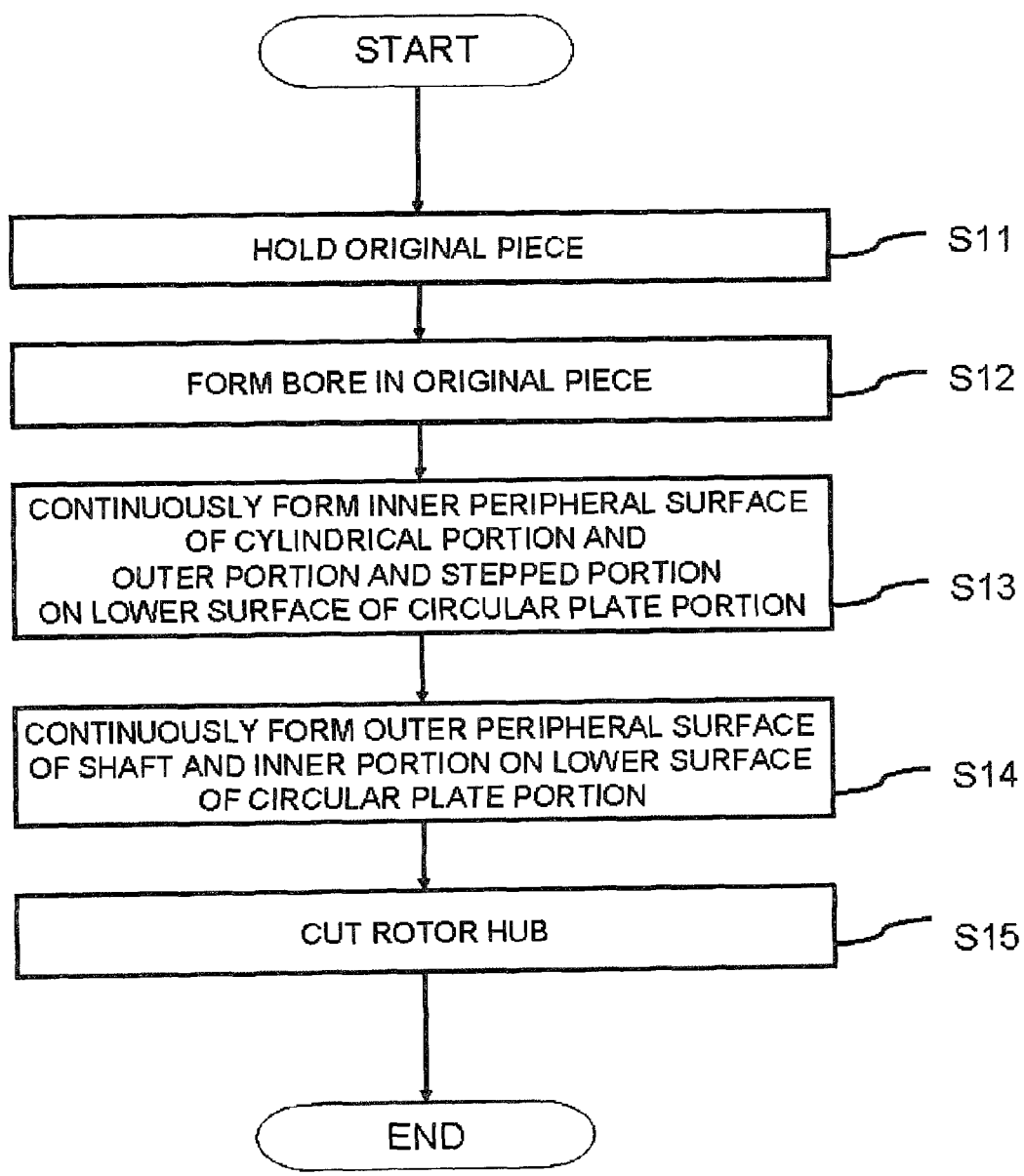
FIG. 8 is a flowchart illustrating processes of manufacturing the rotor hub.

A method of manufacturing the rotor hub 31 is now described. FIG. 8 is a flowchart illustrating the manufacturing method of the rotor hub 31, and FIGS. 9A to 9E are process diagrams in the course of manufacturing the rotor hub 31.

Figure 9A:
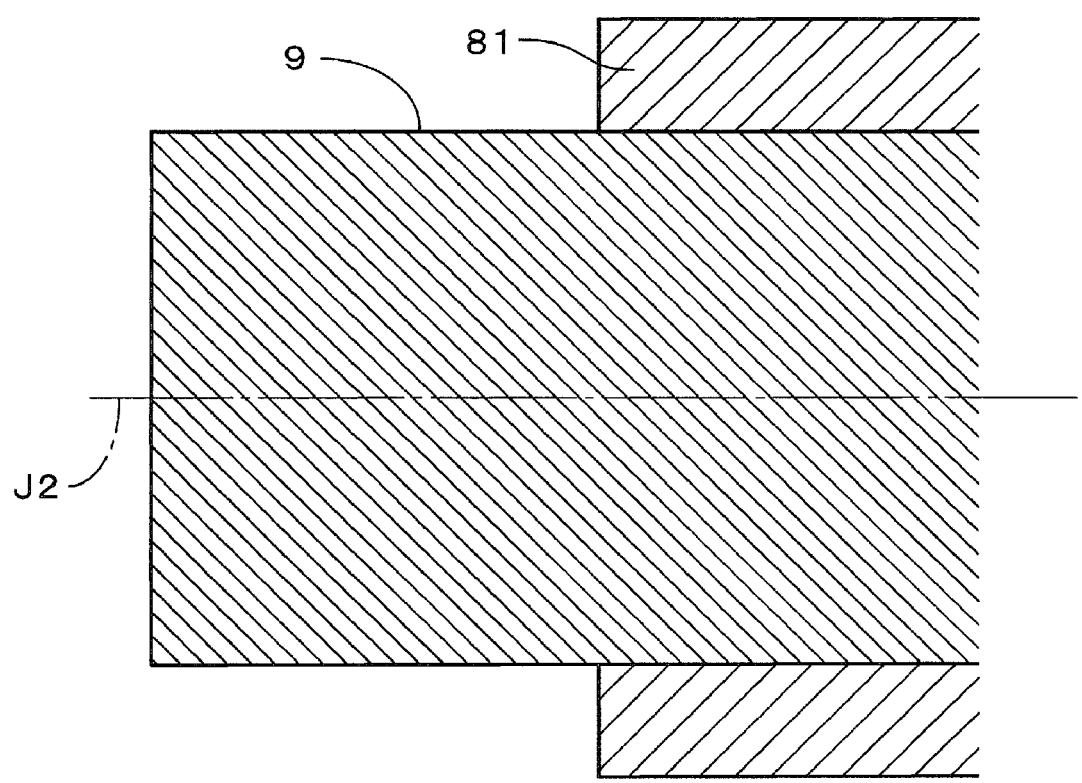
FIGS. 9A, 9B, 9C, 9D, and 9E are process diagrams in the course of manufacturing the rotor hub.

As shown in FIG. 9A, a substantially columnar original piece (work-in-process) 9 to be processed is held by a chuck 81 which is a holding portion of an NC lathe (numerically controlled lathe) (Step S11). One of the chuck 81 and a tool such as a drill or a turning tool is relatively rotated about a predetermined central axis J2 relative to the other. In this preferred embodiment, the chuck 81 is rotated relative to the tool. The original piece 9 is held from the outer peripheral side with its central axis substantially aligned with the central axis J2 of the chuck 81.

Figure 9B:
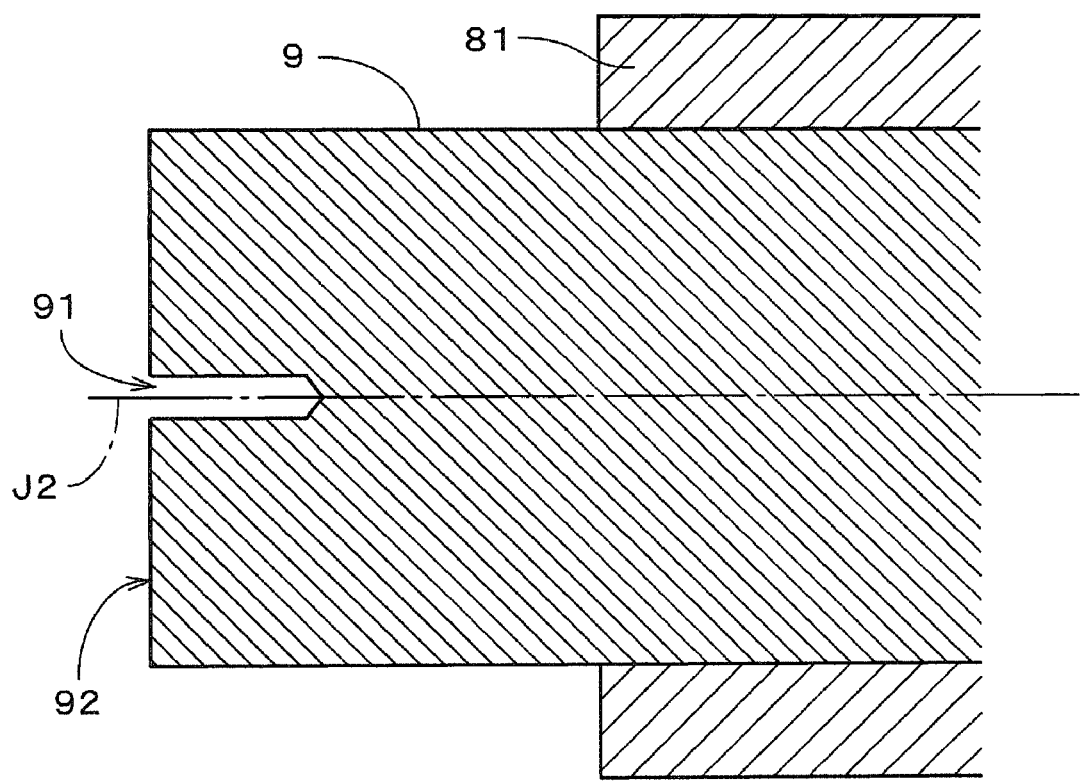

After being held, the original piece 9 is subjected to an appropriate face forming process. Thereafter, a bore 91 centered on the central axis J2 is formed by a drill in the original piece 9 which is rotating together with the chuck 81, as shown in FIG. 9B (Step S12). An end surface 92 on the left of the original piece 9 in the illustration, in which the bore 91 is formed, is referred to as a "process starting surface 92" hereinafter.

Figure 9C:
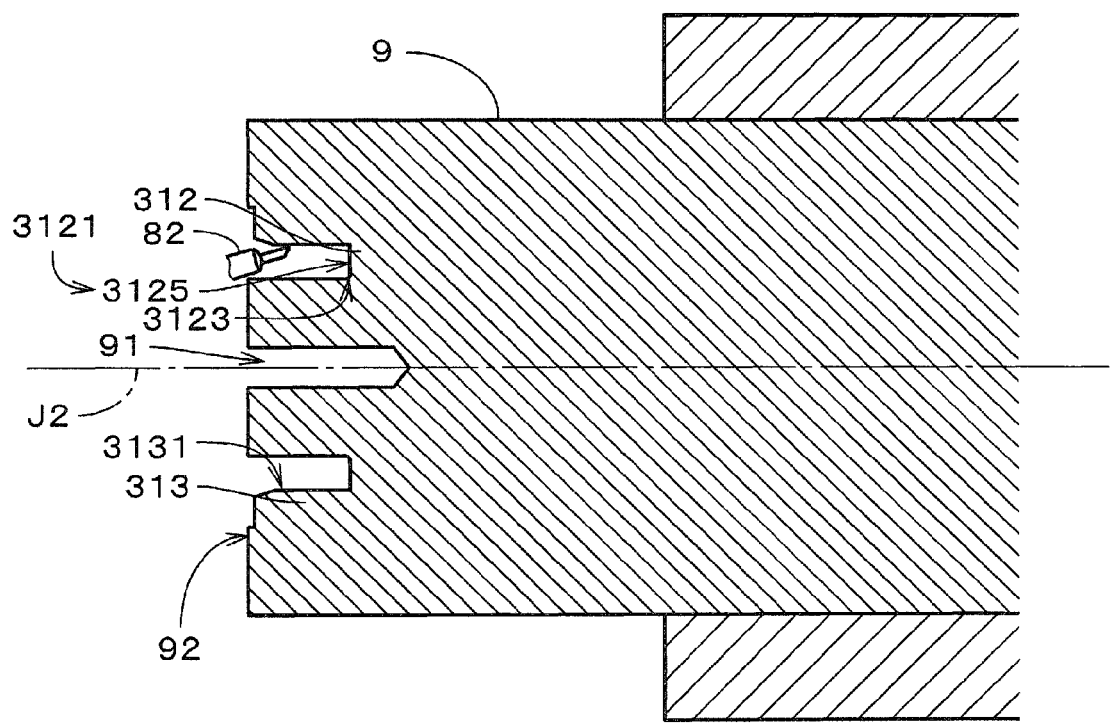

Next, a first turning tool 82 cuts a portion circularly enclosing the bore 91 so as to form an inner peripheral surface 3131 of a substantially cylindrical portion projecting along the central axis J2 at the center toward the process starting surface 92, as shown in FIG. 9C. The substantially cylindrical portion becomes the cylindrical portion 313 shown in FIG. 2, and so is referred to as the "cylindrical portion 313" hereinafter for convenience sake.

Then, directly following the formation of the inner peripheral surface 3131 of the cylindrical portion 313, the first turning tool 82 forms the outer portion 3125 and the stepped portion 3123 on the lower surface 3121 of the circular plate portion 312 (Step S13). In other words, the inner peripheral surface 3131 of the cylindrical portion 313 and the outer portion 3125 and the stepped portion 3123 on the lower surface 3121 of the circular plate portion 312 are formed in a continuous fashion by the first turning tool 82.

Figure 9D:
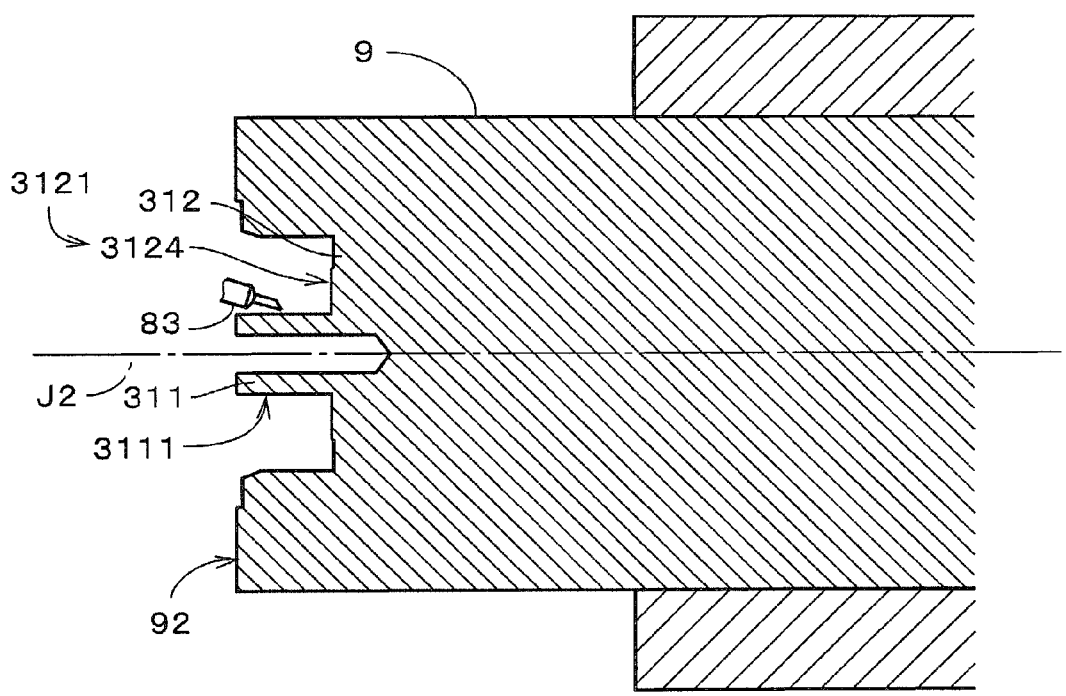

Next, a second turning tool 83, different from the first turning tool 82, cuts the original piece 9 to form an outer peripheral surface 3111 of a substantially cylindrical portion that projects along the central axis J2 at the center toward the process starting surface 92, as shown in FIG. 9D. The substantially cylindrical portion becomes the shaft 311 shown in FIG. 2, and so is referred to as the "shaft 311" hereinafter for convenience sake.

Then, directly following the formation of the outer peripheral surface 3111 of the shaft 311, the second turning tool 83 forms the inner portion 3124 on the lower surface 3121 of the circular plate portion 312 (Step S14). In other words, the outer peripheral surface 3111 of the shaft 311 and the inner portion 3124 on the lower surface 3121 of the circular plate portion 312 are formed by the second turning tool 83 in a continuous fashion.

Figure 9E:
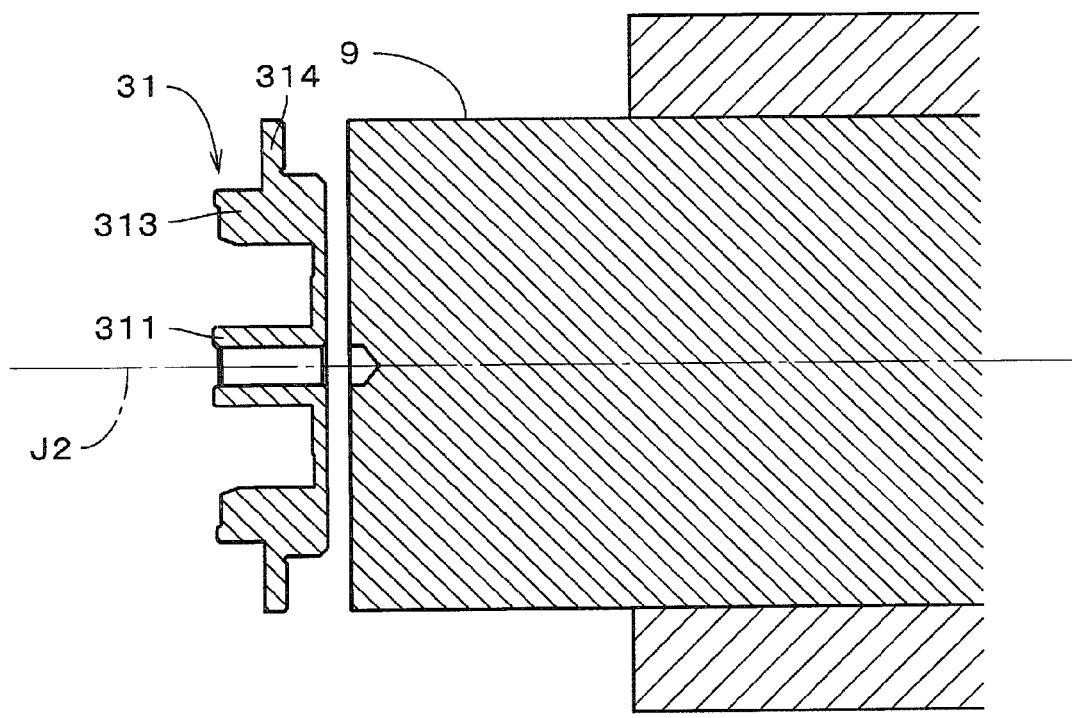

After the formation of the outer peripheral surface 3111 of the shaft 311, the lower surface 3121 of the circular plate portion 312, and the inner peripheral surface 3131 of the cylindrical portion 313, other parts of the rotor hub 31 are formed through cutting operations, as shown in FIG. 9E. The other parts include the outer peripheral surface of the cylindrical portion 313 and the disk placing portion 314, for example. Then, the portion including the shaft 311 and the cylindrical portion 313 is cut along a cutting plane perpendicular to or substantially perpendicular to the central axis J2 to obtain the rotor hub 31 (Step S15).

The rotor hub 31 cut apart from the original piece 9 is held by another chuck disposed at the lower end side of the shaft 311. The rotor hub 31 is performed with cutting on the upper surface of the circular plate portion 312 and the like, and then is washed by, e.g., a washing apparatus to complete the manufacturing of the rotor hub 31.

As hitherto described, the shaft 311, the circular plate portion 312, and the cylindrical portion 313 of the rotor hub 31 in the motor 1 are formed integrally with one another through cutting operations. The inner portion 3124 on the lower surface 3121 of the circular plate portion 312 is formed continuously with the outer peripheral surface 3111 of the shaft 311, and becomes the hub thrust portion 3122 to oppose the sleeve thrust portion 226 on the sleeve main body 221. The stepped portion 3123 between the inner portion 3124 and the outer portion 3125 on the lower surface 3121 of the circular plate portion 312 is disposed on the radially outer side of the thrust dynamic pressure grooves 227 on the sleeve thrust portion 226.

As described above, the stepped portion 3123 is disposed in a region which does not form a portion of the thrust bearing portion, so that the hub thrust portion 3122 can be formed smooth to a high degree of accuracy with respect to the portion in the vicinity of the line of juncture of the portion cut by the first turning tool 82 and the portion cut by the second turning tool 83 in the cutting operations of the rotor hub 31, i.e., the portion in the vicinity of the boundary between the inner portion 3124 and the stepped portion 3123. That is, processes of forming the lower surface 3121 of the circular plate portion 312 can be simplified, and the hub thrust portion 3122 can be formed by cutting at a low cost. As a result, the cost for manufacturing the rotor hub 31 and the motor 1 can be reduced.

Since in the motor 1, the thrust dynamic pressure grooves 227 are provided on the sleeve unit 22 and not on the lower surface 3121 of the circular plate portion 312, formation of the rotor hub 31 through cutting operations can be facilitated. If the thrust dynamic pressure grooves 227 are to be provided on only one of the rotor hub 31 and the sleeve unit 22, the thrust dynamic pressure grooves 227 are provided on the sleeve unit 22, taking into consideration the fact that rotor hub 31 is deformed when the disk 62 is fixed thereon as described above; therefore, the thrust dynamic pressure grooves 227 can be formed easily.

The sleeve unit 22 is provided with the thrust dynamic pressure grooves 227 in its upper portion, only in the sleeve main body 221. That is, only one of the sleeve main body 221 and the sleeve housing 222 has the sleeve thrust portion 226. Therefore, the sleeve unit 22 can be formed more easily, as compared with a case in which the thrust dynamic pressure grooves 227 are provided on both the sleeve main body 221 and the sleeve housing 222.

In the motor 1, provision of the stepped portion 3123 opposite to the upper end surface of the sleeve housing 222 can increase the axial distance between the stepped portion 3123 and the upper end surface of the sleeve unit 22. With this structure, it can be reliably prevented that the stepped portion 3123 touches the sleeve unit 22 due to, e.g., an external impact. As a result, it is possible to prevent generation of noises due to friction of the rotor hub 31 and the sleeve unit 22, as well as lowering of reliability due to abrasion of the sleeve unit 22.

In the rotor hub 31 of the motor 1, the inner portion 3124 is protruded and situated below the outer portion 3125 in the axial direction. As a result, even when air bubbles are generated in the lubricant oil while the motor 1 is being driven, the air bubbles can be moved to the outer peripheral side of the sleeve unit 22 past the areas below the inner portion 3124 and the outer portion 3125, so that the air bubbles can be efficiently released to the outside of the bearing.

In the motor 1, the hub thrust portion 3122 of the rotor hub 31 is provided with the slant surface that gradually separates from the sleeve thrust portion 226 as the distance from the shaft 311 increases, such that the slant surface becomes perpendicular to or substantially perpendicular to the central axis J1 in the state where circular plate portion 312 is bent due to the fixing of the disk 62.

With this structure, the distance in the axial direction between the hub thrust portion 3122 and the sleeve thrust portion 226 can be made uniform after the disk 62 is fixed. As a result, it is possible to improve uniformity of the pressure of the lubricant oil that acts at the thrust bearing portion configured between the hub thrust portion 3122 and the sleeve thrust portion 226 while the disk 62 is spinning. Therefore, the bearing stiffness of the thrust bearing portion can be improved. In addition, it is possible to prevent the sleeve unit 22 and the circular plate portion 312 of the rotor hub 31 from coming into contact with each other.

In manufacturing the rotor hub 31, the process of forming the inner portion 3124 on the lower surface 3121 of the circular plate portion 312, i.e., the hub thrust portion 3122 (Step S14) is performed after the process of forming the outer portion 3125 (Step S13). Thus, a burr, which may be possibly formed on the border between the inner portion 3124 and the stepped portion 3123, can be prevented from sticking out toward the hub thrust portion 3122.

The continuous formation of the outer peripheral surface 3111 of the shaft 311 and the inner portion 3124 on the lower surface 3121 of the rotor hub 31 makes it possible that the outer peripheral surface 3111 and the inner portion 3124 are formed so highly precisely that the inner portion 3124 makes a desired angle of inclination with the outer peripheral surface 3111. Thus, it becomes possible to enhance uniformity of the axial distance between the hub thrust portion 3122 and the sleeve thrust portion 226 after fixing of the disk 62. Further, it becomes possible to further enhance uniformity of the pressure of the lubricant oil at the thrust bearing portion during rotation of the disk 62. As a result, the bearing stiffness of the thrust bearing portion can be further improved, and thus the rotor hub 31 and the disk 62 can be supported even more stably.

Second Preferred Embodiment

Figure 10:
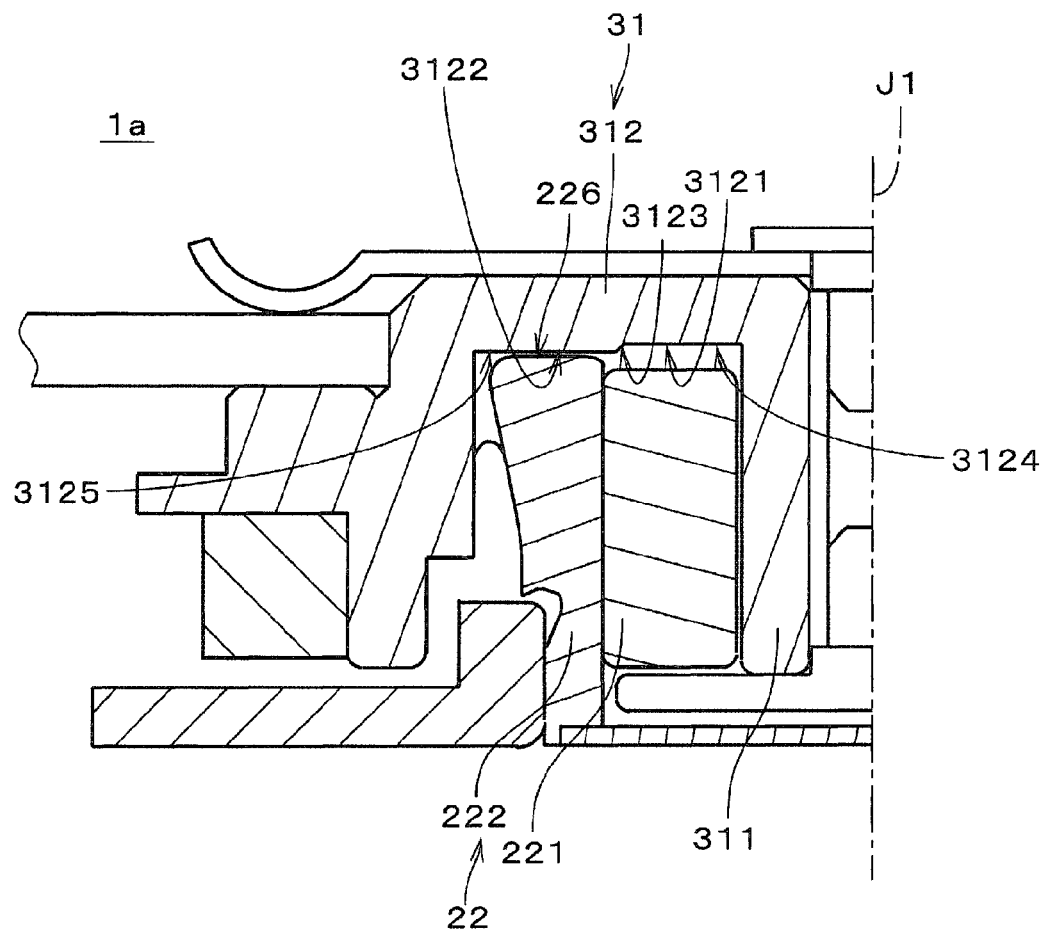
FIG. 10 is a longitudinal cross-sectional view showing part of a motor according to a second preferred embodiment of the present invention.

A motor according to a second preferred embodiment of the present invention is now described. FIG. 10 is a longitudinal cross-sectional view showing part of a motor 1a according to the second preferred embodiment. In the motor 1a as shown in FIG. 10, on the lower surface 3121 of the circular plate portion 312 of the rotor hub 31, the stepped portion 3123 between the inner portion 3124 and the outer portion 3125 is located above the upper end surface of the sleeve main body 221 of the sleeve unit 22. As configurations other than the above are almost the same as those of the motor 1 shown in FIGS. 1 to 3, like reference numerals are given thereto in the description below.

In the motor 1a shown in FIG. 10, the thrust dynamic pressure grooves are provided on the upper end surface of the sleeve housing 222 of the sleeve unit 22. That is, the sleeve housing 222 has the sleeve thrust portion 226. The outer portion 3125 on the lower surface 3121 of the circular plate portion 312 is the hub thrust portion 3122 that axially opposes the sleeve thrust portion 226, and the stepped portion 3123 between the inner portion 3124 and the outer portion 3125 is disposed on the radially inner side of the sleeve thrust portion 226. In the motor 1a, the stepped portion 3123 is formed continuously with the inner portion 3124 through cutting operation.

The stepped portion 3123 is disposed on the lower surface 3121 of the circular plate portion 312 in a region in which the thrust bearing portion is not provided, so that the hub thrust portion 3122 can be formed smooth to a high degree of accuracy with respect to the portion in the vicinity of the boundary between the outer portion 3125 and the stepped portion 3123, in the cutting operations of the rotor hub 31, as in the first preferred embodiment. That is, the processes of forming the lower surface 3121 of the circular plate portion 312 can be simplified, and the hub thrust portion 3122 can be formed by cutting at a low cost. As a result, the cost for manufacturing the rotor hub 31 and the motor 1a can be reduced.

Since the thrust dynamic pressure grooves are provided only on the sleeve housing 222 at the upper end of the sleeve unit 22, the sleeve unit 22 can be formed easily as in the first preferred embodiment. That is, only one of the sleeve main body 221 and the sleeve housing 222 has the sleeve thrust portion 226.

In the motor 1a, since the stepped portion 3123 axially opposes the upper end surface of the sleeve main body 221 of the sleeve unit 22, the stepped portion 3123 and the sleeve unit 22 can be reliably prevented from contacting each other even when, e.g., an external impact is applied, as in the first preferred embodiment. As a result, it is possible to prevent generation of noises caused by friction of the rotor hub 31 and the sleeve unit 22, as well as lowering of reliability due to abrasion of the sleeve unit 22.

The method of manufacturing the rotor hub 31 of the motor 1a is the same as that in the first preferred embodiment, except that the process of forming the outer portion 3125, i.e. the hub thrust portion 3122, on the lower surface 3121 of the circular plate portion 312 is performed after the process of forming the inner portion 3124 and the stepped portion 3123. Therefore, a burr, which may possibly be formed in the vicinity of the boundary between the outer portion 3125 and the stepped portion 3123, can be prevented from sticking out toward the hub thrust portion 3122.

Third Preferred Embodiment

Figure 11:
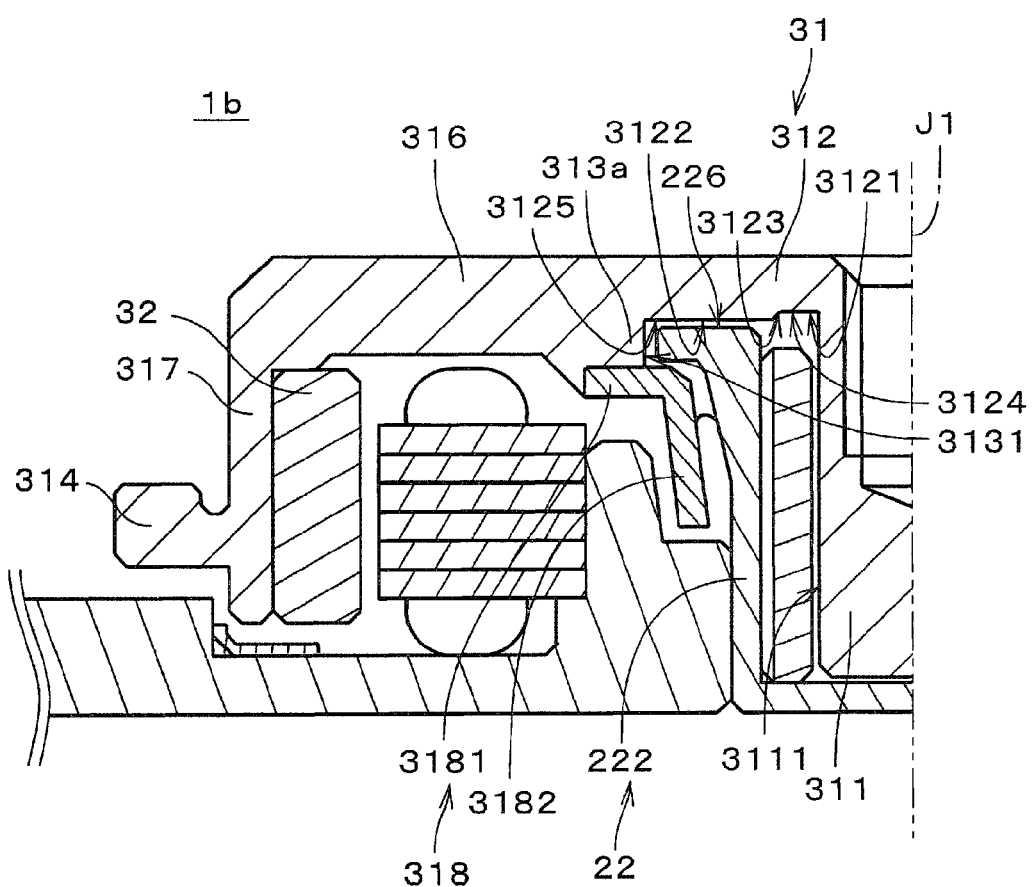
FIG. 11 is a longitudinal cross-sectional view showing part of a motor according to a third preferred embodiment of the present invention.

Next, description is given on a motor according to a third preferred embodiment of the present invention. FIG. 11 is a longitudinal cross-sectional view showing part of a motor 1b according to the third preferred embodiment. As shown in FIG. 11, the motor 1b is an outer-rotor type motor, and its rotor hub 31 includes a shaft 311, a circular plate portion 312, a substantially annular portion 316, a cylindrical portion 313a, a magnet fixing portion 317, and a disk placing portion 314. The circular plate portion 312 extends radially outward from the upper end of the shaft 311. The annular portion 316 extends radially outward from the outer periphery of the circular plate portion 312.

The cylindrical portion 313a has a hollow, substantially cylindrical shape centered on a central axis J1, and protrudes downward from the outer peripheral edge of the circular plate portion 312. The magnet fixing portion 317 protrudes downward from the outer peripheral edge of the annular portion 316, is hollow and substantially cylindrical, and is centered on the central axis J1. A rotor magnet 32 is fixed on the inner peripheral surface of the magnet fixing portion 317. The disk placing portion 314 protrudes radially outward from the outer peripheral surface of the magnet fixing portion 317. In this preferred embodiment, the shaft 311, the circular plate portion 312, the cylindrical portion 313a, the disk placing portion 314, the annular portion 316, and the magnet fixing portion 317 are all formed by a unity piece made of stainless steel, for example, by cutting an original piece. Other configurations are almost the same as those of the motor 1 shown in FIGS. 1 to 3, and like reference numerals are given thereto in the following description.

As shown in FIG. 11, a retaining member 318 which is substantially annular and centered on the central axis J1 is fixed to the lower end surface of the cylindrical portion 313a of the rotor hub 31.

The retaining member 318 has a fixed portion 3181 in the form of a substantially annular plate perpendicular to or substantially perpendicular to the central axis J1, and a projecting portion 3182 which is hollow and substantially cylindrical. The fixed portion 3181 is fixed on a lower portion of the cylindrical portion 313a. The projecting portion 3182 projects downward from the inner peripheral edge of the fixed portion 3181.

In the motor 1b, the top surface of the fixed portion 3181 of the retaining member 318 axially faces the lower surface of a flange portion provided around the outer periphery in the upper portion of the sleeve housing 222, so that the rotor hub 31 is prevented from falling out of the sleeve unit 22. The space between the inner peripheral surface of the projecting portion 3182 of the retaining member 318 and the outer peripheral surface of the sleeve housing 222 serves as an oil buffer of the bearing mechanism. In the motor 1b, the sleeve housing 222 is formed into a hollow, bottomed, and substantially cylindrical shape.

In the motor 1b, the thrust dynamic pressure grooves are provided on the upper end surface of the sleeve housing 222, and the hub thrust portion 3122 is provided in the outer portion 3125 on the lower surface 3121 of the circular plate portion 312, as in the second preferred embodiment. The stepped portion 3123 between the inner portion 3124 and the outer portion 3125 is disposed radially inside the sleeve thrust portion 226.

In the course of manufacturing the rotor hub 31, the inner portion 3124 and the stepped portion 3123 on the lower surface 3121 of the circular plate portion 312 are formed in the cutting operation continued from formation of the outer peripheral surface 3111 of the shaft 311. The outer portion 3125 is formed in the cutting operation continued from formation of the inner peripheral surface 3131 of the cylindrical portion 313a. In this manner, the hub thrust portion 3122 of the rotor hub 31 can be formed by cutting at a low cost, as in the first and second preferred embodiments.

Fourth Preferred Embodiment

Figure 12:
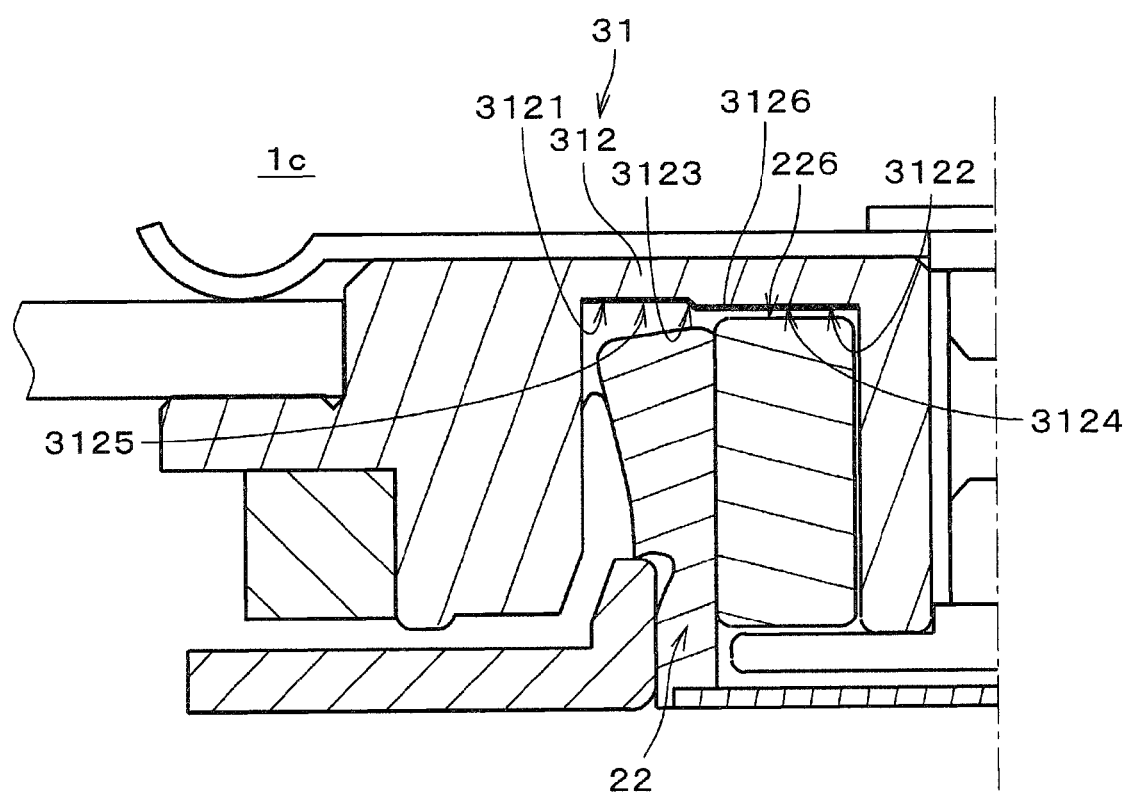
FIG. 12 is a longitudinal cross-sectional view showing part of a motor according to a fourth preferred embodiment of the present invention.

Description is made below on a motor according to a fourth preferred embodiment of the present invention. FIG. 12 is a longitudinal cross-sectional view showing part of a motor 1c according to the fourth preferred embodiment. As shown in FIG. 12, a solid lubricant film 3126 is provided on the lower surface 3121 of the circular plate portion 312 of the rotor hub 31 in the motor 1c. Other configurations are almost the same as those of the motor 1 shown in FIGS. 1 to 3, and like reference numerals are given thereto in the description below.

The solid lubricant film 3126 is formed in the following manner: A lubricant agent solution containing a solid lubricant agent, a thermosetting resin and a solvent is applied on the lower surface 3121 of the rotor hub 31 by spin coating, for example, and is then heated. The formation of the solid lubricant film 3126 is performed after the formation of the outer portion 3125, the stepped portion 3123 and the inner portion 3124 on the lower surface 3121 of the rotor hub 31. In this preferred embodiment, the thickness of the solid lubricant film 3126 is about 30 μm. Examples of the method of forming the solid lubricant film 3126 include printing, in addition to spin coating.

The solid lubricant agent is preferably selected from one of, or a combination of a plurality of materials such as molybdenum sulfide (e.g., molybdenum disulfide), tungsten sulfide (e.g., tungsten disulfide), graphite, boron nitride, antimony trioxide, polytetrafluoroethylene (PTFE), plumbago, mica, talc, soapstone, and zinc oxide. In this preferred embodiment, molybdenum disulfide having an average particle diameter of about 15 μm or less is used as the solid lubricant agent. The average particle diameter is more preferably in the range from about 0.1 μm to about 10 μm.

The thermosetting resin is preferably selected from resins such as polyamide-imide resin, epoxy resin, alkyd resin, phenolic resin, and polyimide resin, for example. In this preferred embodiment, polyamide-imide resin is used as the thermosetting resin. The ratio of molybdenum disulfide to polyamide-imide resin is preferably in the range from about 10% by weight to about 150% by weight.

In the motor 1c, the solid lubricant film 3126 is provided on the lower surface 3121 of the rotor hub 31, so that it is possible to reduce friction of the hub thrust portion 3122 and the sleeve thrust portion 226, which may possibly occur in a state where the rotational speed of the rotor hub 31 is low (for example, immediately after a start of the rotation or before a stop of the rotation). As a result, the durability and reliability of the bearing mechanism can be further improved.

In manufacturing of the rotor hub 31 of the motor 1c, the solid lubricant film 3126 is formed over the outer portion 3125, the stepped portion 3123, and the inner portion 3124 on the lower surface 3121 that have been formed smooth to a high degree of accuracy through cutting operations, as in the first preferred embodiment; therefore, the surface of the solid lubricant film 3126 can be made smooth to a high degree of accuracy.

Note that the surface of the solid lubricant film 3126 may be subjected to cutting to make it smoother to an even higher degree of accuracy in manufacturing the rotor hub 31. Also, a DLC (diamond-like carbon) film may be formed as the solid lubricant film 3126 on the lower surface 3121 of the circular plate portion 312 of the rotor hub 31.

Figure 13:
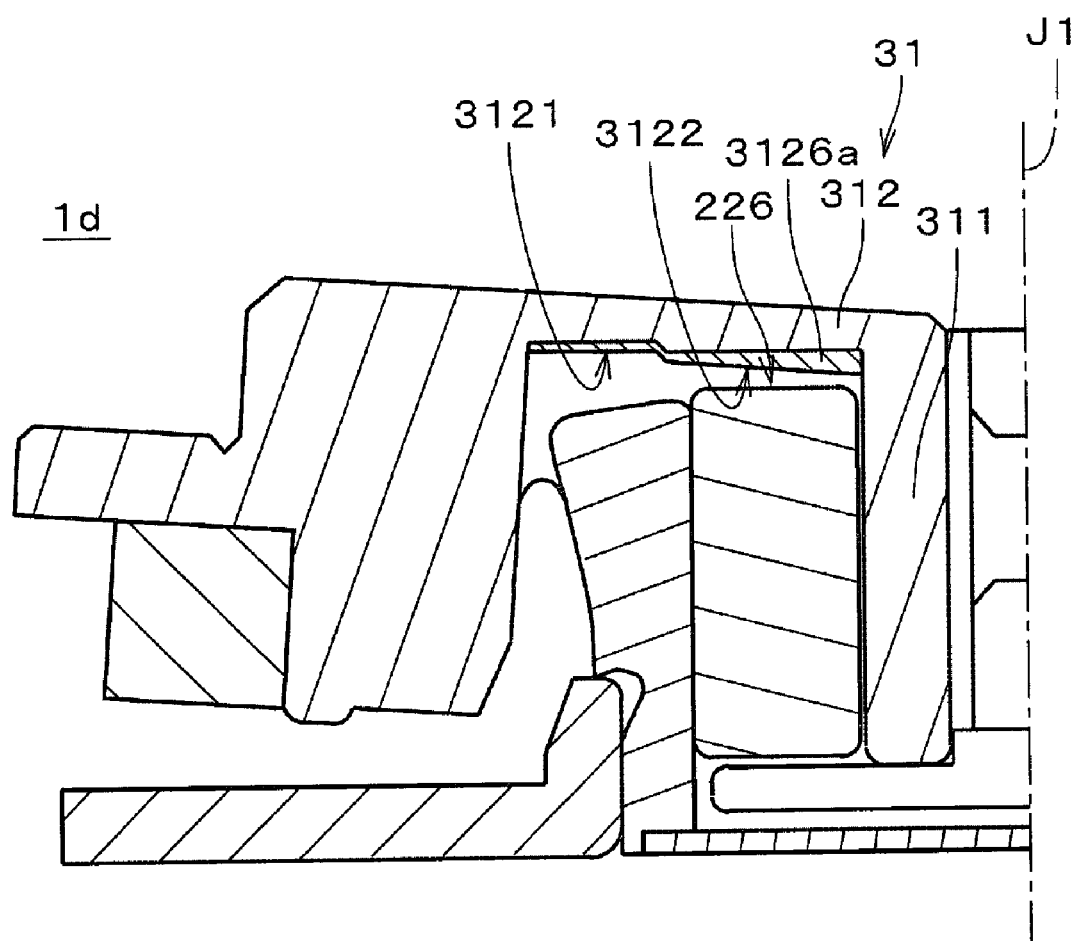
FIG. 13 is a longitudinal cross-sectional view of another exemplary motor according to the fourth preferred embodiment of the present invention.

FIG. 13 shows an exemplary variant of the motor shown in FIG. 12. In a motor 1d shown in FIG. 13, the lower surface 3121 of the circular plate portion 312 of the rotor hub 31 is provided to be perpendicular to or substantially perpendicular to the central axis J1 in the state where a disk is not mounted, and a solid lubricant film 3126a is formed on the lower surface 3121 such that the surface of the film 3126a is at a slant with respect to the central axis J1. In FIG. 13, the thickness of the solid lubricant film 3126a is illustrated in an exaggerated manner in comparison to the actual thickness.

In the motor 1d, the surface of the solid lubricant film 3126a in the hub thrust portion 3122 is formed in a slanting manner such that the film surface gradually separates from the sleeve thrust portion 226 as the distance from the shaft 311 increases. The surface of the solid lubricant film 3126a is formed so as to become substantially perpendicular to the central axis J1 when the circular plate portion 312 is bent due to the fixing of the disk. With this structure, the bearing stiffness of the thrust bearing portion can be enhanced. The surface of the solid lubricant film 3126a in the hub thrust portion 3122 is formed by cutting the solid lubricant film that has been uniformly applied to a predetermined thickness on the lower surface 3121 of the circular plate portion 312.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For instance, the thrust dynamic pressure grooves 227 provided on the upper end surface of the sleeve unit 22 are not always arranged in a spiral arrangement in the motors of the above-described embodiments. The thrust dynamic pressure grooves 27 may be herringbone-shaped grooves.

In the thrust bearing portion provided on the upper side of the sleeve unit, the thrust dynamic pressure grooves are not necessarily provided on the upper end surface of the sleeve unit (i.e., the sleeve main body and the sleeve housing). The thrust dynamic pressure grooves may be provided on the lower surface of the circular plate portion of the rotor hub, for example. If the thrust dynamic pressure grooves are provided in the inner region on the lower surface of the circular plate portion in the motor of the first preferred embodiment, the sleeve thrust portion is defined at the upper end surface of the sleeve main body that axially opposes the inner region. Moreover, the thrust dynamic pressure grooves may be provided on both the upper end surface of the sleeve unit and the lower surface of the circular plate portion.

In manufacturing the rotor hub 31, the formation of the inner portion 3124 of the circular plate portion 312 by cutting is not necessarily performed in continuation of the formation of the entire outer peripheral surface 3111 of the shaft 311. For instance, it is only necessary that the formation of the inner region be performed in continuation of the formation of at least a portion of the outer peripheral surface of the shaft near the circular plate portion. Also, the outer peripheral surface of the shaft 311 may be formed in continuation of and subsequent to the formation of the inner region of the circular plate portion.

Similarly, the formation of the outer portion 3125 of the circular plate portion 312 by cutting is not necessarily performed in continuation of the formation of the entire inner peripheral surface 3131 of the cylindrical portion. For instance, it is only necessary that the formation of the outer portion be performed in continuation of the formation of at least a portion of the inner peripheral surface of the cylindrical portion near the circular plate portion. Also, the inner peripheral surface of the cylindrical portion may be formed in continuation of and subsequent to the formation of the outer portion of the circular plate portion. Chamfering may be performed along the line of juncture of the stepped portion and the hub thrust portion on the lower surface of the circular plate portion as necessary.

In any of the bearing mechanisms of the motors of the above-described embodiments, the sleeve may be provided as a single member instead of the sleeve unit 22 including the sleeve main body 221 and the sleeve housing 222.

Further, a gas dynamic pressure bearing utilizing a gas as the working fluid, for example, may be used as the bearing mechanism.

The disk drive 60 including the motor can be used as a device for driving other kinds of disk-shaped storage media including optical disks and magnetooptical disks in addition to the magnetic disks. The motor may be used in various kinds of devices other than the disk drive, or be used as a drive source of such devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a rotor hub including a shaft rotatable about a central axis, a substantially circular plate portion extending from an upper portion of the shaft outward in a radial direction perpendicular to or substantially perpendicular to the central axis, and a cylindrical portion which is hollow and substantially cylindrical and projects from the substantially circular plate portion downward in an axial direction parallel to or substantially parallel to the central axis;
    a sleeve portion arranged to receive the shaft; and
    a thrust dynamic pressure bearing portion; wherein
    a lower surface of the substantially circular plate portion includes an outer portion continuous with an inner peripheral surface of the cylindrical portion, an inner portion continuous with an outer peripheral surface of the shaft, and a stepped portion connecting the outer portion and the inner portion to each other, the inner portion and the outer portion being substantially annular,
    the outer portion of the substantially circular plate faces the sleeve portion in the axial direction,
    the thrust dynamic pressure bearing portion includes a hub thrust portion, a sleeve thrust portion which is a portion of the sleeve portion and axially opposes the hub thrust portion, and a working fluid arranged between the hub thrust portion and the sleeve thrust portion, and
    the stepped portion is arranged to step up such that an inner gap provided between the inner portion and the sleeve portion is smaller than an outer gap provided between the outer portion and the sleeve portion.

2. The motor according to claim 1, wherein the sleeve portion includes:
    a hollow, substantially cylindrical sleeve housing; and
    a hollow, substantially cylindrical sleeve body arranged inside the sleeve housing, and
    one of the sleeve body and the sleeve housing has the sleeve thrust portion.

3. The motor according to claim 2, wherein the stepped portion opposes the other of the sleeve body and the sleeve housing.

4. The motor according to claim 2, wherein a length of the hub thrust portion in the radial direction is longer than a length of the sleeve thrust portion in the radial direction.

5. The motor according to claim 2, wherein the sleeve thrust portion is provided with thrust dynamic pressure grooves which produce a hydrodynamic pressure while the shaft is rotating.

6. The motor according to claim 1, wherein a length of the hub thrust portion in the radial direction is longer than a length of the sleeve thrust portion.

7. The motor according to claim 1, wherein a radial width of a gap between the inner peripheral surface of the cylindrical portion and an outer peripheral surface of the sleeve portion increases as the gap moves downward from the circular plate portion, and the working fluid is stored in the gap.

8. The motor according to claim 1, wherein the inner portion of the circular plate portion is the hub thrust portion and is located below the outer portion.

9. The motor according to claim 1, wherein the outer portion of the circular plate portion is the hub thrust portion and is located below the inner portion.

10. The motor according to claim 1, further comprising a solid lubricant film formed on the lower surface of the circular plate portion.

11. The motor according to claim 1, wherein a radial dynamic pressure bearing portion is formed by an inner peripheral surface of the sleeve portion, an outer peripheral surface of the shaft, and the working fluid in a gap formed therebetween, and produces a hydrodynamic pressure while the shaft is rotating, the radial dynamic pressure bearing portion being continuous with the thrust dynamic pressure bearing portion.

12. A disk drive comprising:

the motor according to claim 1 operable to rotate a disk-shaped storage medium capable of storing data;

a head operable to carry out at least one of reading data from and writing data onto the disk-shaped storage medium;

a head moving section operable to move the head with respect to the motors and the disk-shaped storage medium.

13. A motor including a bearing mechanism which uses a hydrodynamic pressure, comprising:

a rotor hub including a shaft rotatable about a central axis, a circular plate portion in the form of a substantially circular plate extending from an upper portion of the shaft outward in a radial direction perpendicular to or substantially perpendicular to the central axis, and a cylindrical portion which is hollow and substantially cylindrical and projects from the circular plate portion downward in an axial direction parallel to or substantially parallel to the central axis;

a sleeve portion into which the shaft is inserted; and a disk placing portion on which a disk-shaped storage medium is to attached, wherein a lower surface of the circular plate portion includes an outer portion continuous with an inner peripheral surface of the cylindrical portion, an inner portion continuous with an outer peripheral surface of the shaft, and a stepped portion connecting the outer portion and the inner portion to each other, the inner portion and the outer portion being substantially annular, a thrust dynamic pressure bearing portion includes a hub thrust portion, a sleeve thrust portion which is a portion of the sleeve portion and axially opposes the hub thrust portion, and a working fluid arranged between the hub thrust portion and the sleeve thrust portion, the sleeve thrust portion is a plane substantially perpendicular to the central axis of the shaft, the hub thrust portion slants with respect to the central axis, and the hub thrust portion is perpendicular to or substantially perpendicular to the central axis while the disk-shaped storage medium is mounted on the rotor hub.

* * * * *